E. REDDICK & J. P. NOEL.
TROLLEY.
APPLICATION FILED APR. 11, 1912.
1,078,218.
Patented Nov. 11, 1913.
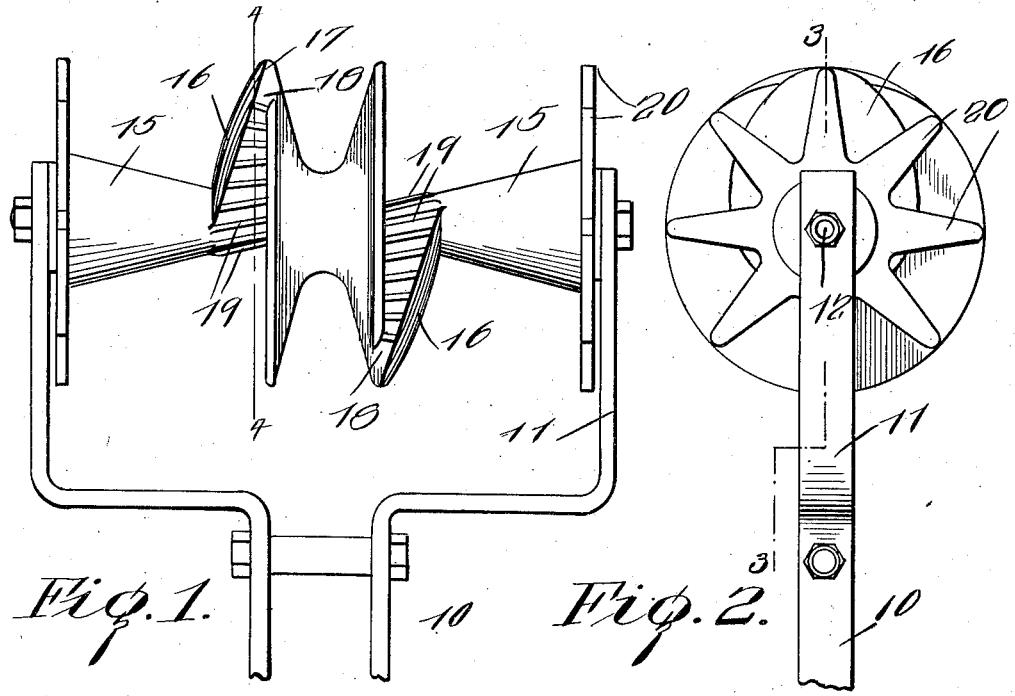
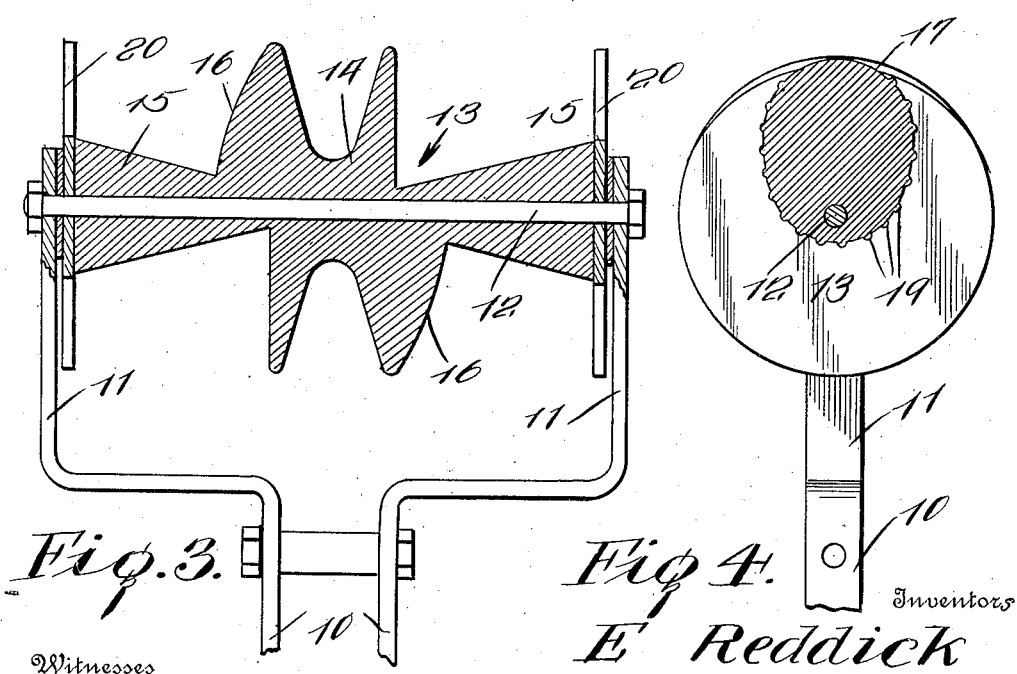

UNITED STATES PATENT OFFICE.

EUGENE REDDICK AND JOHN P. NOEL, OF HACKENSACK, NEW JERSEY.

TROLLEY.

1,078,218.  Specification of Letters Patent.  Patented Nov. 11, 1913.

Application filed April 11, 1912. Serial No. 690,049.

*To all whom it may concern:*

Be it known that we, EUGENE REDDICK and JOHN P. NOEL, citizens of the United States, residing at Hackensack, in the county of Bergen, State of New Jersey, have invented certain new and useful Improvements in Trolleys; and we do hereby declare the following to be a full, clear, and exact description of the invention, such as will enable others skilled in the art to which it appertains to make and use the same.

This invention relates to improvements in trolleys, and has particular reference to guard finders therefor.

Another object is to provide a simple construction of trolley wheel having means for positively guiding the trolley wheel on to the wire, when the same has jumped off.

Another object is to provide means to prevent the trolley from entirely leaving the wire when the wire becomes disengaged from the groove of the wheel.

These and other objects will be apparent from the following description and with particular reference to the accompanying drawings.

In the drawings: Figure 1 is a front elevation of a trolley made in accordance with our invention, Fig. 2 is a side elevation, Fig. 3 is a vertical section on the line 3—3 of Fig. 2, Fig. 4 is a vertical section on the line 4—4 of Fig. 1.

Referring particularly to the drawings, 10 represents the trolley harp in the arms 11 of which is journaled a shaft 12 on which is mounted the trolley wire engaging member 13. The central portion of the trolley wire engaging member comprises the trolley wheel proper 14, and the laterally extending conical finder portions 15, said conical portions having their smaller ends formed integral with the trolley wheel proper. On each of the outer faces of the trolley wheel 14 is an enlargement 16, said enlargements being arranged at diametrically opposite points. The outer end of each of the enlargements projects slightly beyond the periphery of the flange of the wheel 14, as indicated at 17. A groove 18 is formed on the periphery of each of the enlargements 16, and inwardly of the extension 17, said groove disappearing in the flange of the wheel portion 14. The bottom wall of each of the grooves 18 is provided with transverse corrugations 19, which when engaging the wire assist to turn the wheel, and guide the same onto the wire. Mounted on the shaft 12, and at each end of the wire engaging member is a toothed wheel 20, which is adapted to engage the wire support at the crossovers or curves to assist the wheel thereacross and also to prevent the wire from entirely leaving the trolley should it jump the wheel member 14.

It will be noted that the grooves 18 are wider at the bases and taper toward the outer end of the enlargements, and also that the flanges of the wheel portion 14 are gradually reduced toward the extension portion 17 so that the wire will positively ride into the groove of the wheel member 14. Particular attention is also called to the fact that the conical member 15 will guide the wires into the grooves 18, so that in replacing the wheel on the wire it is only necessary to engage one of the conical members with the wire, and permit the same to rotate, which will automatically cause the wire to ride into the grooves, and the same to place itself within the groove in the wheel portion 14.

What is claimed is:

A trolley comprising a harp, a wire engaging member rotatably mounted thereon, said member comprising a central grooved wheel portion, smooth faced conical guide members on each side of the wheel portion, the apices of the conical guides being connected to the wheel portion, a cam enlargement on each flange of the wheel portion and arranged in diametrically opposite positions, each of said enlargements having an inner face inclined toward the flange of the wheel portion, transverse corrugations on the said faces, said faces gradually narrowing toward the outer peripheries of the flanges of the wheel portion, the flanges of the wheel portion being removed at the outer ends of the enlargements to permit entrance of the trolley wire between the flanges of the wheel portion, and toothed wheels at the outer ends of the wire engaging members.

In testimony whereof, we affix our signatures, in presence of two witnesses.

EUGENE REDDICK.
JOHN P. NOEL.

Witnesses:
 JOSEPH H. DENNISSON,
 JAMES V. HAWKINS.

Copies of this patent may be obtained for five cents each, by addressing the "Commissioner of Patents, Washington, D. C."